United States Patent [19]
Cornic et al.

[11] Patent Number: 6,023,238
[45] Date of Patent: Feb. 8, 2000

[54] METHOD AND DEVICE FOR THE REMOVAL OF AMBIGUITY IN DISTANCE, APPLIED ESPECIALLY TO FREQUENCY-SHIFT KEYING CONTINUOUS-WAVE RADARS

[75] Inventors: Pascal Cornic, St Renan; Jean-Paul Artis, Plouzane, both of France

[73] Assignee: Thomson-CSF, Paris, France

[21] Appl. No.: 09/048,857

[22] Filed: Mar. 27, 1998

[30] Foreign Application Priority Data

Mar. 28, 1997 [FR] France .................. 97 03841

[51] Int. Cl.[7] .................................... G01S 13/32
[52] U.S. Cl. ................ 342/129; 342/107; 342/112
[58] Field of Search .................. 342/107, 109, 342/112, 129

[56] References Cited

U.S. PATENT DOCUMENTS

| | | |
|---|---|---|
| 3,750,171 | 7/1973 | Faris . |
| 3,750,172 | 7/1973 | Tresselt . |
| 4,106,019 | 8/1978 | Alexander et al. .................. 342/108 |
| 5,420,591 | 5/1995 | Annee et al. . |
| 5,504,490 | 4/1996 | Brendle et al. . |
| 5,598,163 | 1/1997 | Cornic et al. . |
| 5,646,623 | 7/1997 | Walters et al. .................. 342/129 |

*Primary Examiner*—Ian J. Lobo
*Attorney, Agent, or Firm*—Oblon, Spivak, McClelland, Maier & Neustadt, P.C.

[57] ABSTRACT

Disclosed are a method and a device for the removal of ambiguity in distance. The method computes the distance of the targets detected by the radar using several estimation functions (21, 22, 23). When the estimation functions give substantially the same result, the targets are defined as being in the field of non-ambiguous distances and when the estimation functions give different results, the targets are defined as being in the domain of ambiguous distances. Application especially to frequency-shift keying, continuous-wave radar for automobile traffic control.

11 Claims, 4 Drawing Sheets

METHOD AND DEVICE FOR THE REMOVAL OF AMBIGUITY IN DISTANCE, APPLIED ESPECIALLY TO FREQUENCY-SHIFT KEYING CONTINUOUS-WAVE RADARS

BACKGROUND OF THE INVENTION

The present invention relates to a method and device for the removal of ambiguity in distance, applied especially to a frequency-shift keying continuous-wave (FSK-CW) radar. It can be applied for example to automobile radars and more generally to frequency-shift keying radars that require high detection efficiency while meeting a goal by which they can be manufactured at low cost.

A frequency-shift keying continuous-wave radar can emit in several transmission frequencies, for example in four frequencies. A radar of this kind may be fitted for example into an automobile for an ACC (automotive cruise control) type of function. A radar of this kind is designed to enable control of the cruising speed of automobile vehicles. It detects and localizes the closest vehicle located in the path of the carrier vehicle. The information, especially on distance, is transmitted for example to a computer which, through appropriate interfaces, acts on the engine control system so as to regulate the distance between the carrier vehicle and its predecessor.

Given that, for a given frequency of transmission, the radar is required to make reception during said transmission, one problem to be resolved is that of being sure that a received signal truly corresponds to this given frequency of transmission. This problem to be resolved can be likened to the resolution of second-trace or higher-trace echoes for a pulse radar. In the case of application to an automobile radars this problem is a very big one inasmuch as the potential targets of the radar have radar equivalent surfaces (RES) that are very different from one another. For, it is necessary to prevent for example a truck with a very great RES that is, at the same time, at a great distance from the carrier vehicle from being perceived as a small vehicle at very small distance, with a low RES.

One method could be used to resolve this problem. This method plays on the period of repetition of the frequency frames. To be efficient, this method makes it necessary to vary the period of repetition in very great proportions. This, of itself, leads to low duty factors for the transmitted waves. Now, for a given mean power, a low duty factor means that a high peak power has to be transmitted. This is not possible especially for automobile radars designed for speed control where, for example, firstly it is sought to transmit all the time and as long as possible for constraints of inter-radar interference and, secondly, the prospect of using so-called MMIC technology itself goes against high peak power values.

SUMMARY OF THE INVENTION

The invention is aimed in particular at providing a method for the removal of ambiguity in distance that does not require any increase in the peak power transmitted while at the same time being economical in its implementation and therefore well-suited to an automobile speed control application. To this end, an object of the invention is a method for the removal of ambiguity in distance of a radar, wherein said method computes the distance from the targets detected by the radar by means of several estimation functions, the targets being defined as being in the domain of non-ambiguous distances when the estimation functions give substantially the same result and the targets being defined as being in the domain of ambiguous distances when the estimation functions give different results.

An object of the invention is also a device for the implementation of the above-mentioned method.

The main advantages of the invention are that it provides for a high level of reliability as regards the distances estimated, is well suited to digital receivers, provides distance measurements that show low sensitivity to the frequency drifts of the basic oscillator and to the noise of the receiver, is suited to several types of radars, and is simple to implement.

DESCRIPTION OF THE DRAWINGS

Other features and advantages of the invention shall appear from the following description made with reference to the appended drawings, of which.

MORE DETAILED DESCRIPTION

Figure 1:
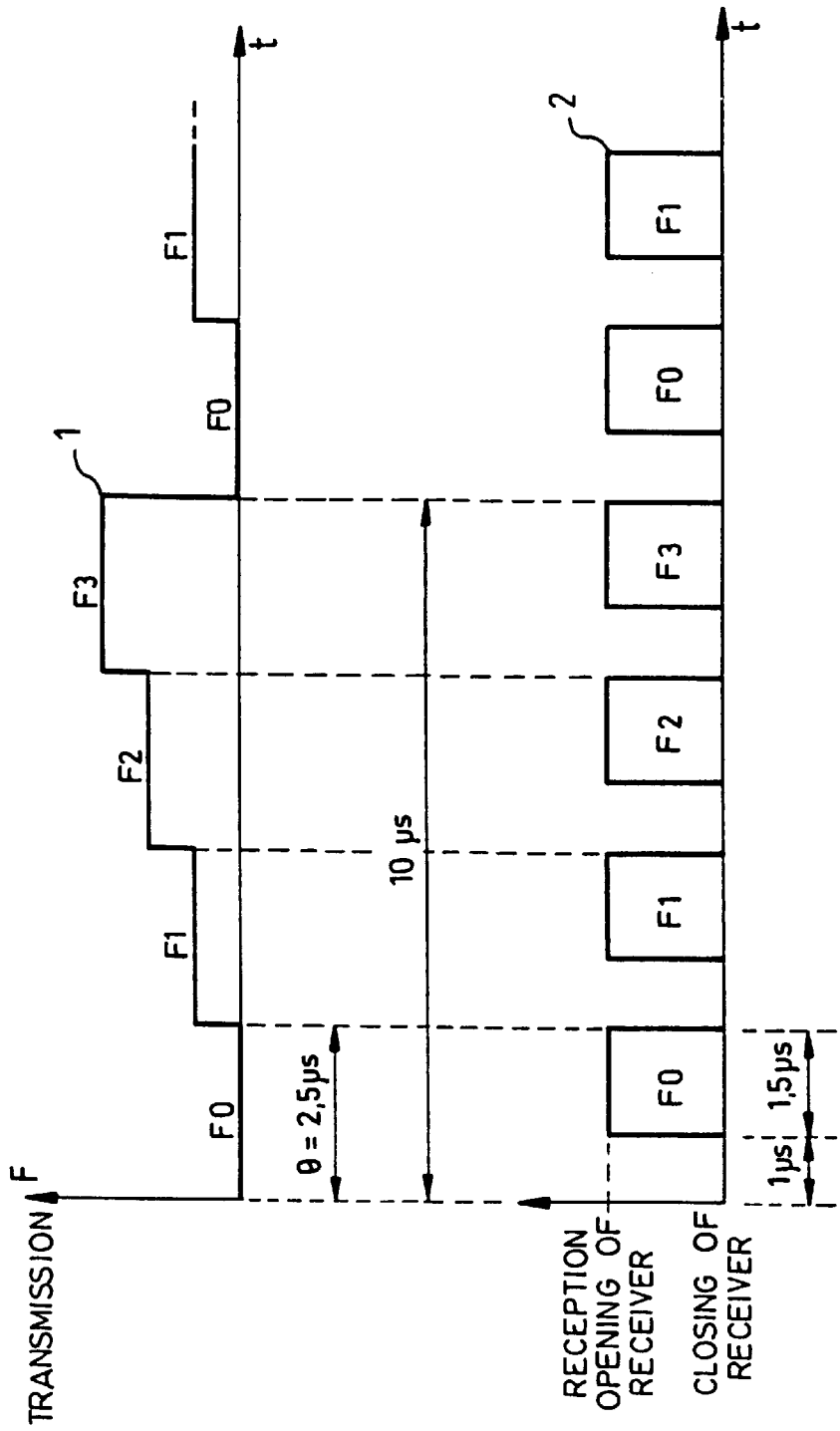
FIGS. 1*a* and 1*b* respectively show exemplary waveforms at transmission and reception of a radar to which the invention is applied.

FIGS. 1*a* and 1*b* give a view, as a function of time, respectively of examples of the waveform 1 at transmission and of the waveform 2 at reception of a frequency-shift keying continuous-wave radar in the case of the use of four frequencies F0, F1, F2, F3 given by way of an example in order to explain the invention. For each recurrence of radar processing, the radar successively makes transmission, for periods equal for example to 2.5 $\mu$s, of a signal at a first frequency F1, then a signal at a second frequency F2, then a signal at a third frequency F3, then a signal at a fourth frequency F4 and then again, for the next recurrence, a signal at the first frequency F1 and so on and so forth. A recurrence constituted by the transmission according to the four successive frequencies F0, F1, F2, F3 is also called a frame. More generally, a frame is a transmission pattern that is repeated periodically. The invention is described for an application with a four-frequency frame. However it can be applied for any number of frequencies greater than or equal to two. At reception, during the transmission of each frequency F0, F1, F2, F3, the receiver is closed for an idle time equal for example to 1 $\mu$s at the beginning of transmission of the frequency, the receiver being open for the rest of the transmission, for example for 1.5 $\mu$s. The idle time is especially designed to minimize the response of the echo signal at a frequency Fi in the reception channel of the next frequency Fi+1 within the limit of the range of the radar, for example 150 to 200 meters.

The four frequencies F0, F1, F2, F3 may be referenced according to the following relationships:

$$F0 = F + k_0 v \qquad (1)$$

$$F1 = F + k_1 v \qquad (2)$$

$$F2 = F + k_2 v \qquad (3)$$

$$F3 = F + k_3 v \qquad (4)$$

where F is any frequency in the band of use of the radar, for example 76 to 77 GHz for an automobile radar, the coefficients $k_i$ are four different integers and $v$ represents a given frequency.

So long as the radar target is located within range of the radar, i.e. for example within a radius of 150 to 200 meters, there can be no overlapping or little overlapping of modulations or inter-modulations between the signals having different frequencies Fi, Fj. It is then possible to therefrom to deduce the received signals $r_0, r_1, r_2, r_3$ after demodulation in the different reception channels, corresponding respectively to the first, second, third and fourth transmission frequencies and given by the following relationships:

$$r_0 = e^{4\pi j \frac{d}{c} F} \cdot e^{4\pi j \frac{d}{c} k_0 v} \quad (5)$$

$$r_1 = e^{4\pi j \frac{d}{c} F} \cdot e^{4\pi j \frac{d}{c} k_1 v} \quad (6)$$

$$r_2 = e^{4\pi j \frac{d}{c} F} \cdot e^{4\pi j \frac{d}{c} k_2 v} \quad (7)$$

$$r_3 = e^{4\pi j \frac{d}{c} F} \cdot e^{4\pi j \frac{d}{c} k_3 v} \quad (8)$$

where the amplitude is standardized at 1 and where d represents the distance between the radar and the target and c the velocity of light.

Assuming:

$$\alpha = \frac{4\pi d}{c} F \quad (9)$$

$$\text{and } \beta_i = 4\pi \frac{d}{c} k_i v \quad (10)$$

we get, for I varying from 0 to 3: $r_i = e^{j\alpha} \cdot e^{j\beta_i}$ (11)

During a radar processing recurrence, it is possible, by means of the four received signals $r_i$ available, to form six different signals $r_{ij}$ such that $rij = r_i - r_j$ where:

$$r_{ij} = e^{j\alpha}[e^{j\beta_i} - e^{j\beta_j}] = e^{j\alpha} \cdot e^{j\left(\frac{\beta_i - \beta_j}{2}\right)} \cdot \sin\left[\frac{\beta_i - \beta_j}{2}\right] \cdot 2j \quad (12)$$

From the above signals rij, the method may for example form four signals:

$$u_k = r_{ij} r_{mn}^* \quad (13)$$

where $r_i$ varies from 0 to 3.

where $r_{mn}^*$ is the conjugate complex number of the received signal $r_{mn}$; the symbol * assigned to a variable hereinafter signifying that it is its conjugate complex number;

and where the pair (i, j) is chosen to be different from the pair (m, n), which theoretically gives access to 16 possible values of the index k of the following variable:

$$u_k = -4e^{j\frac{[(\beta_i + \beta_j) - (\beta_m + \beta_n)]}{2}} \cdot \sin\left(\frac{\beta_i - \beta_j}{2}\right) \cdot \sin\left(\frac{\beta_m - \beta_n}{2}\right) \quad (14)$$

from the relationship (14), it can be deduced that the argument of the variable $u_k$ is given by the following relationship:

$$|Argument[u_k]| = \left|\frac{(\beta_i + \beta_j) - (\beta_m + \beta_n)}{2}\right| \quad (14')$$

from the relationships (10) and (14'), in noting $\hat{d}k$ as the distance estimated from the intermediate value $u_k$, we get:

$$|Argument[u_k]| = \left|\frac{2\pi v \hat{d}_k [(k_i + k_j) - (k_m + k_n)]}{c}\right| \quad (14'')$$

The estimated distance $\hat{d}_k$ is therefore deduced from the above relationship (14') and given by the following relationship:

$$\hat{d}_k = \left| Argument[u_k] \cdot \frac{c}{2\pi v[(k_i + k_j) - (k_m + k_n)]} \right| \quad (15)$$

$\hat{d}_k$ being an estimation of distance from among 16 different estimations.

When the target is beyond the range of the radar, each reception channel receives, from this target, the composition of two successive signals corresponding to two successive transmission frequencies. This leads to a distortion and even to an aberration in the mean phase of the signal received, this distortion being a direct function of the time taken for the radar wave to be propagated to the target and back, namely its to-and-fro time, and of the difference between the two frequencies considered. In this case, the previous processing operation leads to 16 estimation values $\hat{d}_k$ that are highly decorrelated from one another, provided that the values $k_i$ and $k_j$ have been appropriately chosen. This provides an efficient criterion enabling the rejection, in the radar processing, of the echoes coming from a distance greater than the useful range. In practice for example, the use of three values of k suffices to remove the ambiguity up to a distance greater than 1000 meters. Thus, according to the invention, the distance from the targets is detected by means of several estimation functions $\hat{d}_k$ so that all the estimation functions give substantially the same result when the targets are in the non-ambiguous domain and give results different from one another once the targets are in an ambiguous domain.

The frequency plane is chosen for example as a function of a certain number of constraints deduced from the expressions of $u_k$ and $\hat{d}_k$. In particular, the signal $u_k$ used for the detection should not get cancelled in the field of range of the radar outside the zero distance. This in particular dictates the following relationships:

$$\frac{\beta_i - \beta_j}{2} \leq \pi \quad (16)$$

$$\frac{\beta_m - \beta_n}{2} \leq \pi \quad (17)$$

for a distance d equal for example to 200 meters which means in particular that all the terms $(k_i - k_j)v$ usable are smaller than or equal to 750 kHz, giving:

$|k_i - k_j| v \leq 750$ kHz and $|k_m - k_n| v \leq 750$ kHz (18)

Furthermore, in order to meet the goals of reducing noise and short-distance clutter, obtained by the differentiation of the signals received at the different frequencies, the modulus of $u_k$ should for example be as small as possible for an estimated distance of less than 30 meters. For example, in taking $|u_k| \leq 0,1$ for a distance d equal to 30 meters, we get:

$$|\sin[2.10^{-7}\pi v(k_i - k_j)] \cdot \sin[2.10^{-7}\pi v(k_m - k_n)]| \leq 0,1 \qquad (19)$$

or again, given the previous condition concerning the terms $(k_i-k_j)v$:

$$(2.10^{-7}\pi)^2 v^2 |(k_i - k_j)(k_m - k_n)| \leq 0,1 \qquad (20)$$

giving:

$$v^2|(k_i - k_j)(k_m - k_n)| \leq 2,5.10^{11}\,\text{Hz}^2 \qquad (21)$$

From the relationships (18) and (21), we get in particular:

$$|(k_m - k_n)|v \leq 333\,\text{kHz} \qquad (22)$$

Furthermore, in order to ensure sensitivity close to the maximum value at the limit of the range of the radar, the modulus uk may for example be close to 1 for a distance d equal to 150 meters. For example, by setting $$|u_k| \geq 1/\sqrt{2}$$

for a distance d equal to 150 meters, the following relationship is obtained:

$$v^2|(k_i - k_j)(k_m - k_n)| \geq 7,2.10^{10}\,\text{Hz}^2 \qquad (23)$$

From the relationships (22) and (23), we get especially:

$$|k_i - k_j|v \leq 216\,\text{kHz} \qquad (24)$$

One condition to define the frequency plane may for example require that the measurement of the phase corresponding to the distance should be non-ambiguous until the maximum range. In this case, the following relationship must be verified for a distance equal for example to 200 meters:

$$\frac{(\beta_i + \beta_j) - (\beta_m + \beta_n)}{2} \leq \pi \qquad (25)$$

giving for example:

$$v[(k_i + k_j) - (k_m + k_n)] \leq 750\,\text{Hz} \qquad (26)$$

Finally, in order to ensure the feasibility of the control of the microwave oscillator, it is desirable to use only signals whose frequencies differ for example at least by 200 kHz. This condition leads to the following relationships:

$$|(k_i - k_j)v| > 200\,\text{kHz and }|(k_m - k_n)v| > 200\,\text{kHz} \qquad (27)$$

From the above conditions, it is possible for example to deduce that any association of four signals used to estimate distance must for example, depending on the goals fixed, meet at least the constraints defined by the relationships (18), (22), (24) and (26) for all the pairs (i, j), (m, n). On the basis of these constraints, a frequency plane may be defined for example. The four frequencies F0, F1, F2, F3 may be chosen especially so that the frequencies $k_i v$ defined by the relationships (1), (2), (3), (4) are substantially uniformly distributed between 0 and 750 kHz. These frequencies may for example be defined as follows:

$$k_0 v \approx 0 \qquad (28)$$

$$k_1 v \approx 250\,\text{kHz} \qquad (29)$$

$$k_2 v \approx 500\,\text{kHz} \qquad (30)$$

$$k_3 v \approx 750\,\text{kHz} \qquad (31)$$

the sign $\approx$ meaning "roughly equal to".

The choice of the exact values may be optimized on the basis of simulations taking account of the specific form of the radar, especially the order of appearance of the different frequencies, the duration of each transmission squarewave and the time taken by the local oscillator to home in to changes in frequency.

Figure 2:
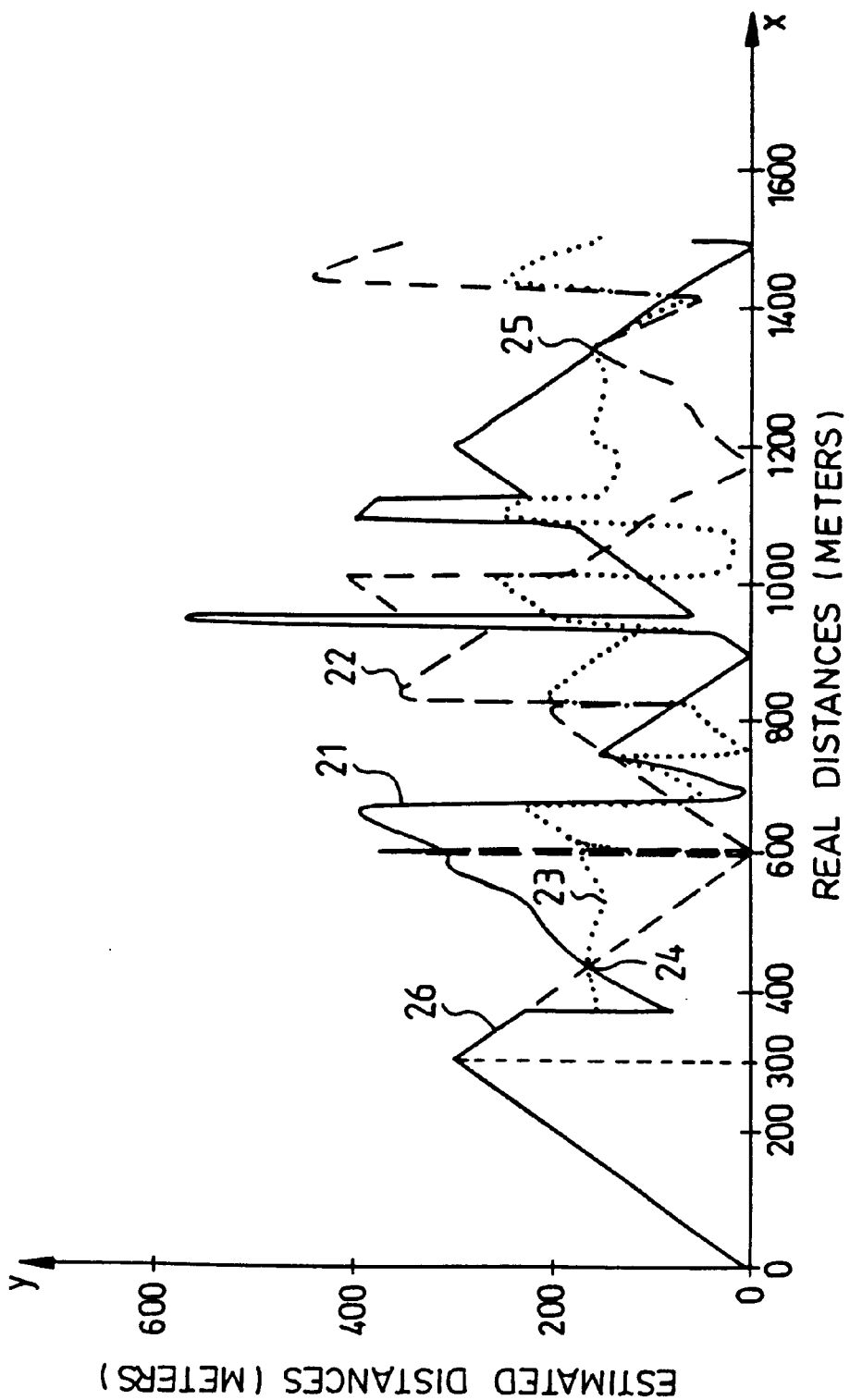
FIG. 2 gives an exemplary view of the estimated distance on the basis of three estimation functions.

FIG. 2 gives an exemplary view of the estimated distance between 0 and 1500 meters by the three estimation functions $\hat{d}_7, \hat{d}_8, \hat{d}_{13}$ defined by the following relationships:

$$\hat{d}_7 = \left| Argument[(r_0 - r_2)(r_1 - r_2)^*] \cdot \frac{c}{2\pi v[(k_0 + k_2) - (k_1 + k_2)]} \right| \qquad (32)$$

$$\hat{d}_8 = \left| Argument[(r_0 - r_2)(r_1 - r_3)^*] \cdot \frac{c}{2\pi v[(k_0 + k_2) - (k_1 + k_3)]} \right| \qquad (33)$$

$$\hat{d}_{13} = \left| Argument[(r_1 - r_2)(r_1 - r_3)^*] \cdot \frac{c}{2\pi v[(k_1 + k_2) - (k_1 + k_3)]} \right| \qquad (34)$$

with for example v=250 kHz and $k_0=0, k_1=1, k_2=2, k_3=2$.

FIG. 2 is a view of the above estimation functions in a system of x, y axes, the x axis representing the real distances and the y axis representing the estimated distances. A first curve 21 drawn in a solid line represents the distance estimated by the estimation function $\hat{d}_7$, a second curve 22 in dashes represents the estimation function $\hat{d}_{13}$ and a third curve 23 in dots represents the estimation function $\hat{d}_8$. These curves also show that the results of the estimation functions are substantially equal for real distances of 0 to 300 meters and then that, beyond this latter distance, the three estimated values become decorrelated, giving a criterion by which it is possible to reject targets that are ambiguous in distance. It would also be possible for example to use the modulus of the functions $r_{ij}$ or $u_k$ defined here above as a criterion for the acceptance or rejection of the targets detected by the radar, making it possible especially to increase the robustness of the method.

For example, it is possible to define a function of validation of the targets on the basis of the signals received as follows:

the validation function is equal to 1 if all the following relationships (35), (36), (37), (38) are verified, by writing:

$$\hat{d}\,\text{mean} = \frac{\hat{d}_7 + \hat{d}_8 + \hat{d}_{13}}{3}$$

$$|\hat{d}_{13} - \hat{d}_7| \leq 0,025\,\hat{d}\,\text{mean} \qquad (35)$$

-continued $$|\hat{d}_7 - \hat{d}_8| \leq 0{,}025 \, \hat{d} \text{ mean} \quad (36)$$

$$|\hat{d}_8 - \hat{d}_{13}| \leq 0{,}025 \, \hat{d} \text{ mean} \quad (37)$$

sign of $\hat{d}_{13}$=sign of $\hat{d}_7$=sign of $\hat{d}_8$ (38)

the validation function being zero in all the other cases.

The validation function is then equal to 1 when the detected target is non-ambiguous. If not, it is equal to zero.

The robustness of this validation function can be improved by adding for example the following supplementary constraints, in writing:

$$K_1 = \frac{r_0 - r_1}{r_1 - r_2}, K_2 = \frac{r_1 - r_2}{r_2 - r_3}, K_3 = \frac{r_0 - r_1}{r_1 - r_3}, K_4 = \frac{r_0 - r_2}{r_1 - r_3},$$

and $Kmean = \dfrac{K_1 + K_2 + K_3 + K_4}{4}$ $$|K_1 - Kmean| \leq 0{,}5 \quad (39)$$

$$|K_2 - Kmean| \leq 0{,}5 \quad (40)$$

$$|K_3 - Kmean| \leq 0{,}5 \quad (41)$$

$$|K_4 - Kmean| \leq 0{,}5 \quad (42)$$

$$Kmean \leq 1, \quad (43)$$

the validation function being equal to 1 if all the relationships (35) to (43) are verified and, if not, being zero.

Figure 3:
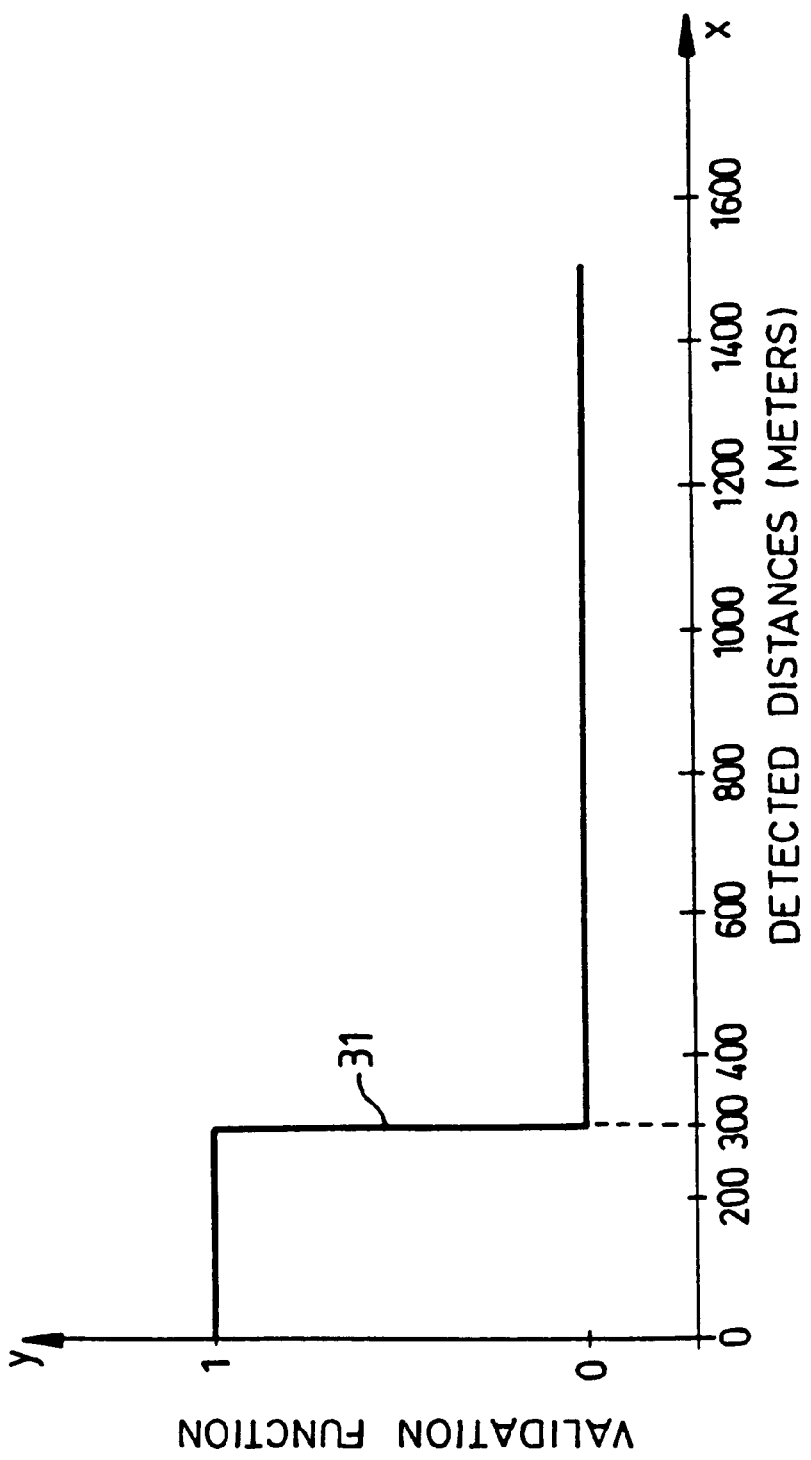
FIG. 3 exemplifies a representation of a distance validation function estimated from the previous three functions.

FIG. 3 shows an exemplary depiction of this latter function by a curve 31 in a system of axes x, y, the x axis representing the distance detected and the y axis representing the value of the validation function. This curve 31 shows especially that, between 0 and 300 meters, the detected target is considered to be valid and will therefore be taken into account by the radar processing operation, and that, beyond 300 meters, the target is never validated. In fact, the robustness provided by the relationships (39) to (43) enables the elimination of the false distances which, however, correspond to cases where the three estimation functions come within the brackets defined under the relationships (35) to (38). This makes it possible especially to eliminate singular values such as isolated intersection points 24, 25 of the three curves 21, 22, 23 representing estimation functions. This further makes it possible to eliminate values that are false but correlated, such as for example those values included within a straight line segment 26 with a negative slope starting from 300 meters in the case of FIG. 2. Values of this kind are obviously false because the estimated distances must increase as a function of the real distance. To avoid the ambiguity provided by all these values without making use of the additional conditions of robustness, it is possible to carry out a simple sorting operation in choosing only the estimated values below a certain threshold, for example 200 meters.

The above example of an implementation of the method according to the invention uses three estimation functions. It is possible to choose only two of them if a lower degree of robustness is accepted or if, for example, this lower robustness is compensated for by other additional constraints. In this case, the above distance threshold may for example be reduced. The reliability of the method according to the invention may, on the contrary, be reinforced through the changing of the estimation functions at each frame, the number of estimation functions being for example equal to three per frame and for example at least one estimation function being changed from one frame to another. This makes it possible to improve the reliability of the removal of ambiguity of the targets by ascertaining that the estimations remain correlated from one frame to another although the estimation functions are different.

Another possible implementation of the method according to the invention may consist for example in using only one estimation function per frame by changing the estimation function at each frame. Thus, if three estimation functions are used successively, the removal of ambiguity is done every three frames, namely the time needed for obtaining three estimated distances. One advantage provided by this mode of implementation is that it does not require several reception channels, one drawback however being that it is necessary for example to wait at least for three frames to run through in order to remove the ambiguity.

Figure 4:
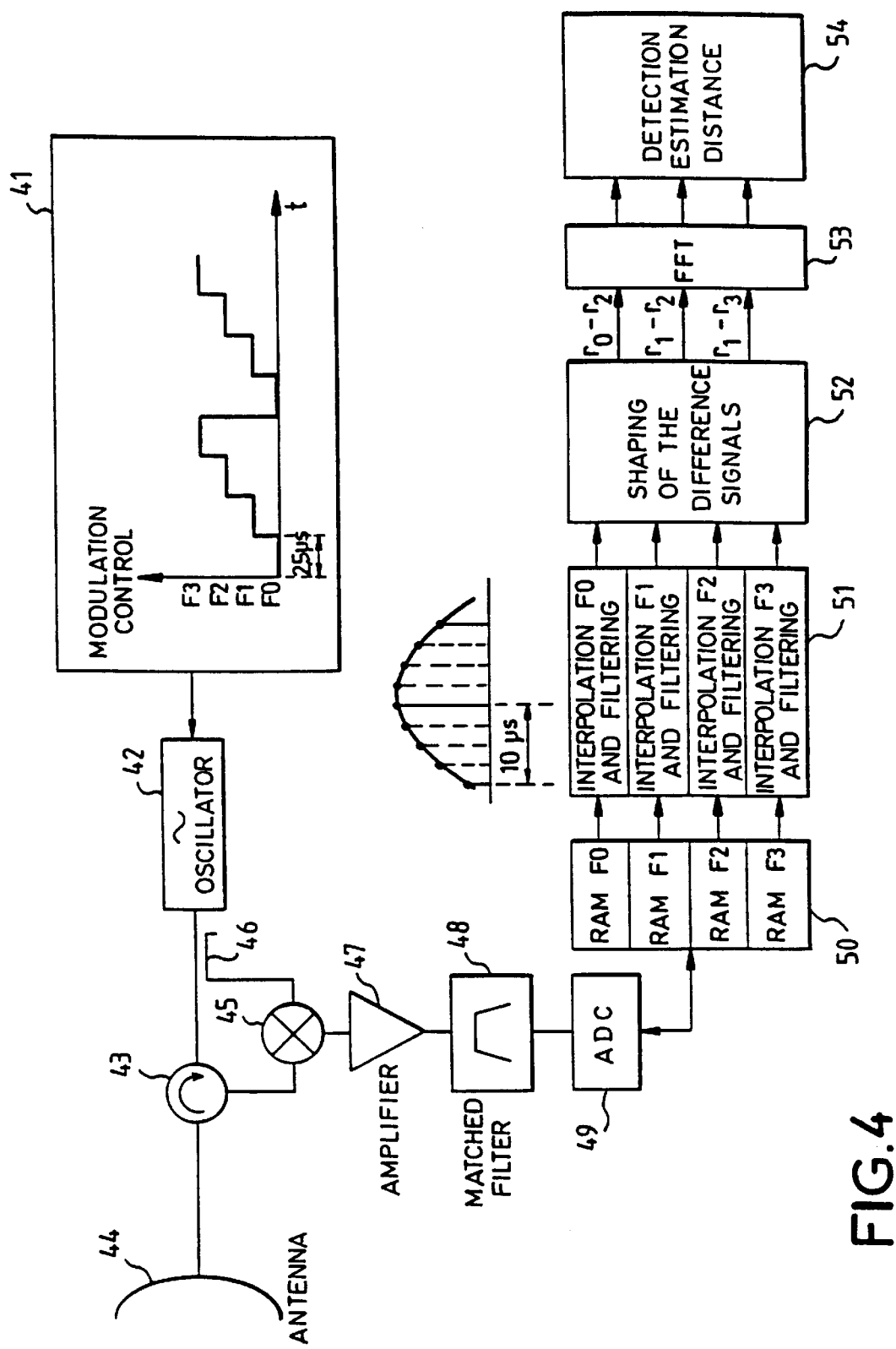
FIG. 4 shows an possible exemplary embodiment for the implementation of the method according to the invention.

FIG. 4 uses a block diagram to show an exemplary possible embodiment for the implementation of a method according to the invention. The receiver may be an analog receiver, it may use analog and digital technologies or it may be entirely digital. The exemplary embodiment shown in FIG. 4 has an entirely digital receiver, providing for simple and reliable implementation. This receiver is for example of the homodyne type. This exemplary embodiment is also applied to a frequency-shift keying continuous-wave radar, the wave being transmitted in frames of four frequencies for example according to the shape shown in FIG. 1.

Modulation control means 41 control a local oscillator 42 so that it delivers four frequencies for example according to the relationships (1) to (4) and, the relationships (28) to (31). This oscillator 42 is connected to a circulator 43 to provide the transmission wave to an antenna 44 through this circulator and amplification means that are not shown. A signal received by this antenna is given through the circulator 43 to a mixer 45 which furthermore, through a coupler 46, receives the output signal from the oscillator 42. The output signal from the mixer 45 is for example amplified by an amplifier 47 whose output is connected to the input of a matched filter 48. The output of this matched filter 48 is connected to the input of an analog-digital converter 49. This converter samples the reception signal received, amplified and filtered and then converts it digitally. The sampling is done for example at the frequency of 400 kHz so as to generate four digital signals at the frequency of 100 kHz corresponding to the four transmission frequencies of the radar should each transmission squarewave have a duration of 2.5 $\mu$s. There is then one sampling per transmission squarewave. The converter is followed by four reception channels, one channel being associated with one transmission frequency. In the event of insufficient speed of the analog-digital converter, this converter may be replaced by four converters, each assigned to a reception channel. Each reception channel has a random-access memory or RAM 50 at input designed to memorize the sampled signal corresponding to the frequency of its channel. The output of a RAM 50 is connected to means 51 for the interpolation and filtering of the sample signal. These means perform, for example, a linear interpolation so as to achieve compensation, in the case of a detected target, for possible differences in Doppler phase shifts from one channel to another, these phase shifts being related to the fact that the transmission and reception are not done at the same point in time in all the channels. The signals are then filtered in a lowpass filter whose cutoff frequency corresponds for example to the maximum Doppler phase shift for a relative speed equal for example to 160 km/h.

The interpolation and filtering means 51 are followed by means 52 for the forming of different signals. Fast Fourier transform computation means 53 are used to define the phase shifts between the phase shifts of the different signals and therefore to define the arguments needed for the distance estimation function defined according to the relationship (15). Thus, by applying the exemplary implementation of the method according to the invention in relation to FIG. 2 and to the relationships (32), (33) and (34), the means for forming the different signals give the signals $r_0-r_2$, $r_1-r_2$ and $r_1-r_3$. The means 53 for computing the fast Fourier transform are applied to each of these difference signals which deliver the computed phase shifts to computation means 54. These means 54 have for example, in memory, the values of the frequencies $k_i v$ defined for example according to the relationships (28) to (31) as well as the constants $\pi$ and c. They thus compute the estimated distances according to the relationships (32) to (34) and then apply the validations function defined by the relationships (35) to (38) or (35) to (43), the different coefficients or constants being stored. The computation means 54 are contained for example in a signal processing computer with greater functions including especially speed detection. The computations made according to the above relationships do not require any special additional circuits within the signal processing computer.

The method according to the invention does not require any increase in the peak power transmitted, one of its main advantages being the high efficiency of the waveform used, the efficiency being defined by the ratio of the duration of opening of a reception channel to the duration of transmission of its corresponding frequency. An efficiency of 60% may for example be obtained. The method according to the invention is furthermore economical especially inasmuch as it does not substantially complicate the circuits and can be well adapted to a homodyne type receiver which is itself costly. In particular, it can be well suited to a receiver made by means of digital technology. This feature may further contribute to making its application economical. Indeed, most of the digital circuits needed may be already available, especially in signal processing. This is the case in particular with the means for the computation of fast Fourier transforms, the means for the forming of the different signals and even the interpolation and filtering means as well as the memories. A digital technology makes it possible furthermore to increase the reliability of detection since it does not require particular settings and does not entail the risk of drifts in time. Different simulations performed by the present Applicant have also shown that the method according to the invention shows low sensitivity to the frequency drifts of the oscillator, the noise from the receiver and the differential gain between the reception channels. The implementation device shown in FIG. 4 is incorporated into a continuous-wave radar. However it can be further equipped to be adapted to a monopulse radar, and the different reception channels may then be present on the sum channel.

Finally, the invention can be applied to radars that are not frequency-shift keying radars. For example it can be applied to radars where the frequency remains constant but where it is the phase that changes, the distance estimation function being then different from the one presented in this description. As in the case of a frequency-shift keying radar, the method according to the invention then computes the distance from the target detected by means of several estimation functions in such a way that all the estimation functions give substantially the same result when the targets are in the non-ambiguous domain and give results that are different from one another once the targets are in the ambiguous domain.

The invention has been explained on the basis of the use of a four-frequency transmission waveform. However, it can be applied to another number of frequencies, for example five frequencies, where the five transmission frequencies are given by the following relationships:

$$F0=F$$

$$F1=F+k_0 v \quad (45)$$

$$F2=F+k_1 v \quad (46)$$

$$F3=F+k_2 v \quad (47)$$

$$F4=F+k_3 v \quad (48)$$

For example, the values of these frequencies may be substantially:

F0=76 GHz

F1=F0+250 kHz

F2=F0+500 kHz

F3=F0+750 kHz

F4=F0+1000 kHz

In this case, the useful frequencies for computing the distance are for example the frequencies F1, F2, F3 and F4 according to the relationships (5) to (43).

In the examples shown, the pitch between the frequencies is constant. However this is not obligatory. In other words the value v is not the same from one frequency to another but takes a value $v_i$ at each frequency. In this case, the coefficient $\beta_i$ of the relationship (10) becomes:

$$\beta_i = 4\pi \frac{d}{c} k_i v_i$$

The other relationships can then be applied in the same way for the computation of the distance.

What is claimed is:

1. A method for the removal of ambiguity in distance of a radar, wherein said method computes the distance from the targets detected by the radar by means of several distance estimation functions, the targets being defined as being in the domain of non-ambiguous distances when the distance estimation functions give substantially the same result, and the targets being defined as being in the domain of ambiguous distances when the distance estimation functions give different results, a particular distance estimation function being defined by the following relationship:

$$\hat{d}_k = \left| Argument[u_k] \cdot \frac{c}{2\pi v[(k_i + k_j) - (k_m + k_n)]} \right|$$

$\hat{d}_k$ being the distance estimation function;

c being the velocity of light;

$u_k = (r_i - r_j)(r_m - r_n)^*$, $r_i$, $r_j$, $r_m$ and $r_n$ being respectively the signals received in relation to the i, j, m, n order frequency of a transmission frame; and "argument" indicating a particular combination of pairs of received frequencies $k_i$, $k_j$, $k_m$ and $k_n$ being coefficients defining frequencies Fi, Fj, Fm, Fn of transmission of the frame as follows:

$$Fi=F+k_i v_i$$

$$Fj=F+k_j v_j$$

$$Fm=F+k_m v_m$$

$$Fn=F+k_n v_n$$

F being a given base frequency and $v_i, v_j, v_m, v_n$ being complementary frequencies that are given.

2. A method according to claim 1, wherein the complementary frequencies $v_i, v_j, v_m, v_n$ are substantially equal to a given frequency $v$.

3. A method according to claim 1, wherein at least one distance estimation function is modified from one transmission frame to another.

4. A method according to claim 3, wherein only one estimation is performed per transmission frame.

5. A method according to claim 1, wherein the same distance estimation functions are used from one transmission frame to another.

6. A method according to claim 1 wherein, the radar being a frequency-shift keying radar, each frame comprising a given number of successive transmission frequencies, the distance estimation functions are based on the phase difference between difference signals obtained from pairs of received signals, each signal corresponding to a frequency of the frame.

7. A method according to claim 1, wherein the base frequency F is within the 76–77 Ghz band.

8. A method according to claim 2 wherein, with a frame comprising four frequencies, the coefficients $k_i, k_j, k_m$ and $k_n$ are substantially equal respectively to 0, 1, 2 and 3 and the complementary frequency $v$ is substantially equal to 250 kHz.

9. A method according to claim 2 wherein, with a frame comprising five frequencies (F0, F1, F2, F3, F4), the first frequency (F0) being equal to the base frequency F, the coefficients $k_i, k_j, k_m$ and $k_n$ are substantially equal respectively to 0, 1, 2 and 3 and the complementary frequency $v$ is substantially equal to 250 kHz.

10. A method according to claim 1, wherein the number of distance estimation functions used per frequency frame is equal to three.

11. A method according to claim 10, wherein the three distance estimation functions $\hat{d}_7, \hat{d}_8, \hat{d}_{13}$ are defined by the following relationships:

$$\hat{d}_7 = \left| Argument[(r_0 - r_2)(r_1 - r_2)^*] \cdot \frac{c}{2\pi v[(k_0 + k_2) - (k_1 + k_2)]} \right|$$

$$\hat{d}_8 = \left| Argument[(r_0 - r_2)(r_1 - r_3)^*] \cdot \frac{c}{2\pi v[(k_0 + k_2) - (k_1 + k_3)]} \right|$$

$$\hat{d}_{13} = \left| Argument[(r_1 - r_2)(r_1 - r_3)^*] \cdot \frac{c}{2\pi v[(k_1 + k_2) - (k_1 + k_3)]} \right|$$

* * * * *